United States Patent
Vazach et al.

(10) Patent No.: US 10,474,120 B2
(45) Date of Patent: Nov. 12, 2019

(54) SYSTEMS AND METHODS FOR REDUNDANT MONITORING OF ELECTRICAL PROPERTY IN HIGH AVAILABILITY SYSTEMS

(71) Applicant: ROCKWELL AUTOMATION TECHNOLOGIES, INC., Mayfield Heights, OH (US)

(72) Inventors: Joseph G. Vazach, Mentor, OH (US); Edward C. Hopsecger, Mentor, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 353 days.

(21) Appl. No.: 15/092,356

(22) Filed: Apr. 6, 2016

(65) Prior Publication Data
US 2017/0293278 A1 Oct. 12, 2017

(51) Int. Cl.
*G05B 19/048* (2006.01)
*G05B 19/042* (2006.01)
*G05B 23/02* (2006.01)

(52) U.S. Cl.
CPC ....... *G05B 19/048* (2013.01); *G05B 19/0423* (2013.01); *G05B 19/0428* (2013.01); *G05B 23/0235* (2013.01); *G05B 2219/21087* (2013.01)

(58) Field of Classification Search
CPC ........ G01R 19/16528; G01R 19/16576; G05B 19/048; G05B 2219/21087
USPC .......................................................... 700/33
See application file for complete search history.

(56) References Cited

U.S. PATENT DOCUMENTS

| | | | | |
|---|---|---|---|---|
| 4,331,952 A | * | 5/1982 | Galvin | G08B 29/16 340/506 |
| 6,618,265 B2 | * | 9/2003 | Chang | H02J 4/00 307/12 |
| 9,785,135 B2 | * | 10/2017 | Shah | G05B 19/0423 |
| 2012/0049879 A1 | * | 3/2012 | Crites | H02S 50/10 324/761.01 |
| 2013/0082716 A1 | * | 4/2013 | Lopez Rodriguez | G01R 31/2836 324/537 |

(Continued)

OTHER PUBLICATIONS

Howard, Adam: A Practical 'Live' Migration Strategy for Upgrading Safety Systems in the Oil and Gas Industry. Allen-Bradley, Rockwell Software, Rockwell Automation, Feb. 2011.

(Continued)

*Primary Examiner* — Chun Cao
(74) *Attorney, Agent, or Firm* — Fletcher Yoder, P.C.

(57) ABSTRACT

A system includes a control device that coordinates within the system to control one or more operations of industrial automation equipment. The system also includes a terminal base that couples to the control device, wherein the terminal base includes a circuit. The system further includes a first input module and a second input module that couple to the terminal base. The first input module includes a first resistor and a first measuring device, and the second input module includes a second resistor and a second measuring device. The terminal base electrically couples the first resistor to the circuit and electrically isolates the second resistor from the circuit when the first input module and the second input module are coupled to the terminal block.

20 Claims, 5 Drawing Sheets

(56) References Cited

U.S. PATENT DOCUMENTS

2015/0347161 A1* 12/2015 Kretschmann ....... H05K 7/1468
710/8

OTHER PUBLICATIONS

Rentcome, Allen and McLin, Rick: Safety, cost drive oil and gas production to the seabed. Rockwell Automation, Jun. 1, 2011.
ICS Triplex SurgeGard Incipient Surge Protection. Allen-Bradley, Rockwell Software, Rockwell Automation, Nov. 2011.

* cited by examiner

SYSTEMS AND METHODS FOR REDUNDANT MONITORING OF ELECTRICAL PROPERTY IN HIGH AVAILABILITY SYSTEMS

BACKGROUND

The present disclosure relates generally to improving redundant monitoring of a sensor in a high availability system.

BRIEF DESCRIPTION

Generally, the present disclosure discusses concepts regarding improving redundant monitoring of a sensor in a high availability system.

In a first embodiment, a system includes a control device that coordinates within the system to control one or more operations of industrial automation equipment. The system also includes a terminal base that couples to the control device, wherein the terminal base includes a circuit. The system further includes a first input module and a second input module that couple to the terminal base. The first input module includes a first resistor and a first measuring device, and the second input module includes a second resistor and a second measuring device. The terminal base electrically couples the first resistor to the circuit and electrically isolates the second resistor from the circuit when the first input module and the second input module are coupled to the terminal block.

In a second embodiment, an input module includes a resistor. The input module also includes a measuring device that measures an electrical property across the resistor. The input module further includes a contact that couples to a circuit when the input module is coupled to a terminal base that includes the circuit. The contact disconnects other input modules from the circuit when the input module is coupled to the circuit while keeping the resistor electrically coupled to the circuit.

In a third embodiment, a method includes receiving, via a processor, a first set of measurements from a first input module and a second input module, wherein the first set of measurements is associated with a first electrical property across a first resistor of the first input module when the first input module and the second input module are coupled to a terminal base. The method also includes adjusting, via the processor, one or more operations of industrial automation equipment when the first set of measurements exceeds a threshold value. The method further includes receiving, via the processor, a second set of measurements from the second input module, wherein the second set of measurements is associated with a second electrical property across a second resistor of the second input module when the second input module is coupled to the terminal base and the first input module is uncoupled from the terminal base. The method also includes adjusting, via the processor, the one or more operations of the industrial automation equipment when the second set of measurements exceeds the threshold value.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Embodiments of the present disclosure are generally directed towards improving high availability systems. High availability systems generally refer to redundant monitoring of a sensor. In certain embodiments, high availability systems may be available for use with industrial automation equipment to ensure that the equipment is operating continuously. High availability systems may include redundant monitoring of a sensor output received from one of a number of parallel-connected input modules. Each input module may measure an electrical property (e.g., a current, voltage, etc.) associated with a sensor (e.g., a current sensor, a temperature sensor, etc.). As such, the input module may include a resistor, which may vary in resistance based on a sensor type (e.g., 4-20 mA current loop sensor, magnetic sensor, NAMUR sensor, Vortex sensor, etc.). In certain embodiments, a terminal base associated with the high availability system may include circuitry to receive a number of input modules available but wired such that just one input module is electrically coupled to the high availability system at any given time. As such, the multiple input modules installed in the high availability system may provide redundant monitoring services in the case that one input module is not operable. Additional details regarding improving high availability systems and redundant monitoring of the sensor may report accurate and correct measurements are described below.

Figure 1:
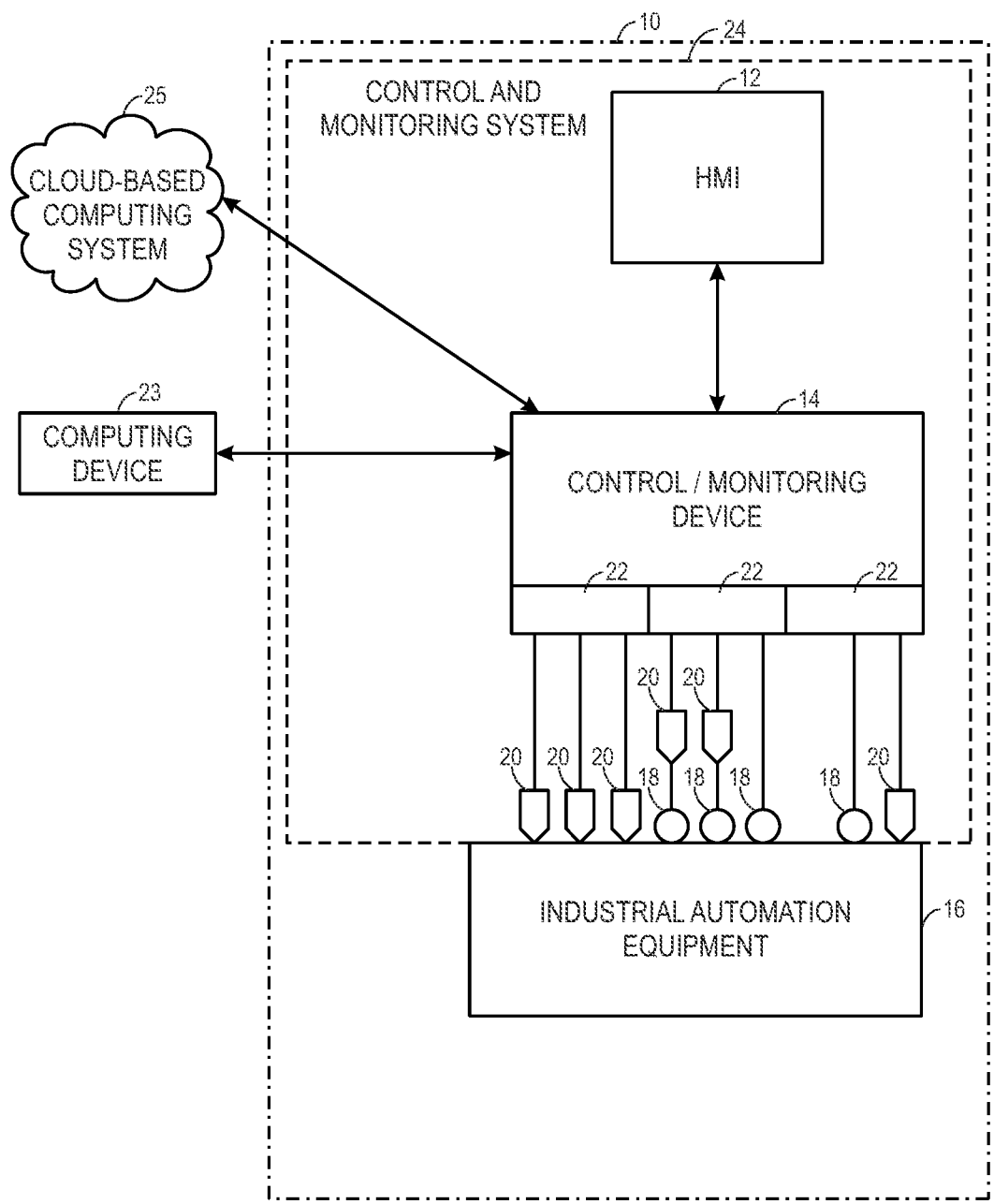
FIG. 1 is a block diagram of a control and monitoring system in accordance with an embodiment of the present disclosure.

FIG. 1 is a block diagram of a control and monitoring system 10 in accordance with an embodiment of the present disclosure. The control and monitoring system 10 may include a human machine interface (HMI) 12 and a control/monitoring device or automation controller 14 adapted to interface with devices (e.g., the sensor 18) that may monitor various types of industrial automation equipment 16. It should be noted that the control and monitoring system 10 may be implemented by certain network strategies. For example, an industry standard network may be employed, such as DeviceNet, to enable data transfer. Such networks permit the exchange of data in accordance with a predefined protocol, and may provide power for operation of networked elements.

The industrial automation equipment 16 may take many forms and include devices for accomplishing many different and varied purposes. For example, the industrial automation equipment 16 may include machinery used to perform various operations in a compressor station, an oil refinery, a batch operation for making food items, a mechanized assembly line, and so forth. Accordingly, the industrial automation equipment 16 may comprise a variety of operational components, such as electric motors, valves, actuators, temperature elements, pressure sensors, or a myriad of machinery or devices used for manufacturing, processing, material handling, and other applications.

Additionally, the industrial automation equipment 16 may include various types of equipment that may be used to perform the various operations that may be part of an industrial application. For instance, the industrial automation equipment 16 may include electrical equipment, hydraulic equipment, compressed air equipment, steam equipment, mechanical tools, protective equipment, refrigeration equipment, power lines, hydraulic lines, steam lines, and the like. Some example types of equipment may include mixers, machine conveyors, tanks, skids, specialized original equipment manufacturer machines, and the like. In addition to the equipment described above, the industrial automation equipment 16 may also include controllers, input/output modules, motor control centers, motors, HMIs, operator interfaces, contactors, starters, additional sensors, actuators, drives, relays, protection devices, switchgear, compressors, sensor, actuator, firewall, network switches (e.g., Ethernet switches, modular-managed, fixed-managed, service-router, industrial, unmanaged, etc.) and the like.

In certain embodiments, one or more properties of the industrial automation equipment 16 may be monitored by certain equipment for regulating control variables used to operate the industrial automation equipment 16. For example, the sensor 18 may monitor various properties of the industrial automation equipment 16.

In some cases, the industrial automation equipment 16 may be associated with devices used by other equipment. For instance, scanners, gauges, valves, flow meters, and the like may be disposed on industrial automation equipment 16. Here, the industrial automation equipment 16 may receive data from the associated devices and use the data to perform their respective operations more efficiently. For example, a controller (e.g., the control/monitoring device 14) of a motor drive may receive data regarding a temperature of a connected motor and may adjust operations of the motor drive based on the data.

The sensor 18 may be a device adapted to provide information regarding process conditions. The sensor 18 may be utilized to monitor the industrial automation equipment 16. In particular, the sensor 18 may be utilized within process loops that are monitored by the control/monitoring device 14 and/or the HMI 12. Such a process loop may be activated based on process inputs (e.g., input from the sensor 18) or direct operator input received through the HMI 12. As illustrated, the sensor 18 is in communication with the control/monitoring device 14. Further, the sensor 18 may be assigned a particular address in the control/monitoring device 14 and receive power from the control/monitoring device 14 or attached modules. There may be any number of the sensors 18 electrically coupled to the control/monitoring device 14 monitoring the industrial automation equipment 16.

The input modules 20 may be installed or removed from the control and monitoring system 10 via expansion slots, bays, a terminal base 22, or other suitable mechanisms. The terminal base 22 may be configured to electrically couple to any number of various components, such as the input modules 20, and route signals between the various components and the control/monitoring device 14. In certain embodiments, the input modules 20 may be included to add functionality to the control/monitoring device 14, or to accommodate additional process features. For instance, the input modules 20 may communicate with new sensors 18 added to monitor the industrial automation equipment 16. It should be noted that the input modules 20 may communicate directly to sensors 18 through hardwired connections or may communicate through wired or wireless sensor networks, such as Hart or IOLink. In some embodiments, the input modules 20 may be in the form of input/output modules.

Generally, the input modules 20 may serve as an electrical interface to the control/monitoring device 14 and may be located proximate or remote from the control/monitoring device 14, including remote network interfaces to associated systems. In such embodiments, data may be communicated with the remote input modules 20 over a common communication link, or network, wherein modules on the network communicate via a standard communications protocol. Many industrial controllers can communicate via network technologies such as Ethernet (e.g., IEEE802.3, TCP/IP, UDP, EtherNet/IP, and so forth), ControlNet, DeviceNet or other network protocols (Foundation Fieldbus (H1 and Fast Ethernet) Modbus TCP, Profibus) and also communicate to higher level computing systems.

In the illustrated embodiment, several of the input modules 20 are configured to transfer input signals between the control/monitoring device 14 and the industrial automation equipment 16. As illustrated, the sensor 18 may communicate with the control/monitoring device 14 via the several input modules 20 electrically coupled to the control/monitoring device 14. The several input modules 20 may be utilized redundantly, such that if one of the several input modules 20 becomes unavailable, one of the remaining input modules 20 may operate in its place. In this manner, the control and monitoring system 10 may continue operating without interruption despite an input module 20 becoming unavailable.

In certain embodiments, the control and monitoring system 10 (e.g., the HMI 12, the control/monitoring device 14, the sensors 18, the input modules 20) and the industrial automation equipment 16 may make up an industrial application 24. The industrial application 24 may involve any type of industrial process or system used to manufacture, produce, process, or package various types of items. For example, the industrial applications 24 may include industries such as material handling, packaging industries, manufacturing, processing, batch processing, and the like. In certain embodiments, the control/monitoring device 14 may be communicatively coupled to a computing device 23 and a cloud-based computing system 25. In this network, input and output signals generated from the control/monitoring device 14 may be communicated between the computing device 23 and the cloud-based computing system 25.

Figure 2:
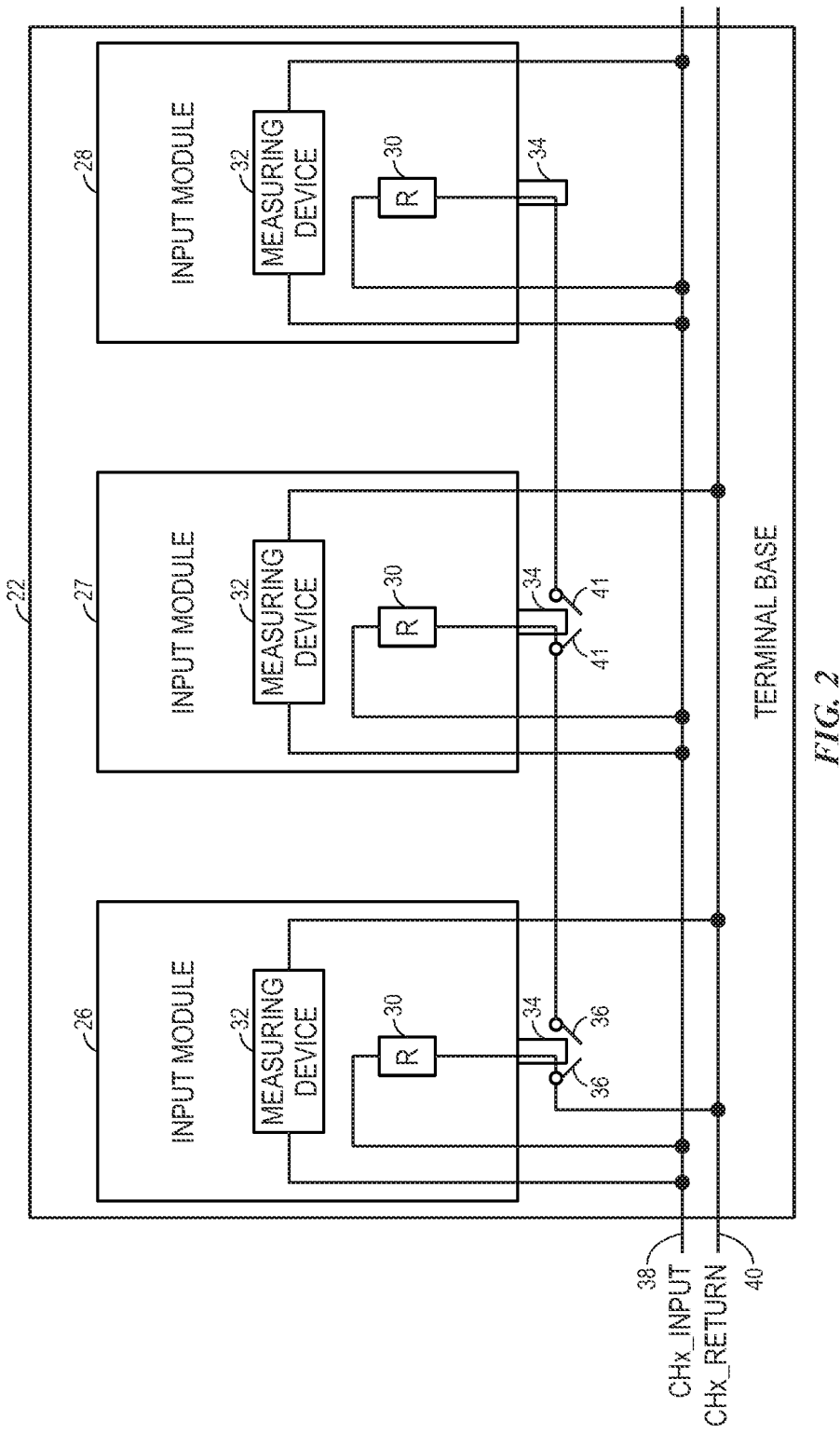
FIG. 2 is a schematic diagram of a terminal base that may be part of the control and monitoring system of FIG. 1, in accordance with an embodiment of the present disclosure.

FIG. 2 is a schematic diagram of the terminal base 22 that may be part of the control and monitoring system 10 of FIG. 1, in accordance with an embodiment of the present disclosure. A plurality of the input modules 20 may be coupled to the terminal base 22. In the illustrated embodiment, three input modules 26, 27, 28 are coupled to the terminal base 22. It should be noted that, in some embodiments, two or more input modules 20 may be coupled to the terminal base 22 to provide redundancy. Each input module 20 may include a resistor 30, a measuring device 32, and a contact connector 34. A resistance of the resistor 30 may be based on a sensor type (e.g., 4-20 mA current loop sensor, magnetic sensor, NAMUR sensor, Vortex sensor, etc.). The measuring device 32 may measure one or more electrical properties of an electrical signal across the resistor 30 and may include a relatively high impedance (e.g., an analog-to-digital converter, an operational amplifier, and the like) with regard to a potential load, such that there is little to no loading effect because of its presence. That is, because the measuring device 32 exhibits a relatively high impedance, a relatively small amount of current may conduct through the measuring device 32, resulting in little to no loading effect.

The contact connectors 34 enable the input modules 26, 27 to open the contacts 36, 41 of the terminal base 22 such that a circuit or signal path that includes input modules 26, 27, 28 may be opened when the input modules 26, 27 are placed in the terminal base 22. For instance, the contacts 36 may open the circuit of the terminal base 22 and redirect a signal from the resistor 30 of the input module 26, such that the signal does not continue to input modules 27, 28 when the input module 26 is electrically coupled to the terminal base 22 via the contact connector 34. As such, the terminal base 22 may be designed such that, when each input module 26, 27, 28 of the plurality of input modules is coupled to the terminal base 22, one input module (e.g., input module 26) provides an input load resistance (e.g., through resistor 30 of input module 26) while the remaining input load resistances 30 of input modules 27, 28 are effectively electrically disconnected from the circuit.

The terminal base 22 may include a channel input wire 38 that provides a channel input (CHx_Input) signal and a channel return wire 40 that provides a channel return (CHx_Return) signal. The channel input wire 38 and the channel return wire 40 may complete the circuit or signal path in the terminal base 22. That is, the channel input wire 38 may couple to each input module 26, 27, 28, and the channel return wire 40 may provide return paths for input modules 26, 27, 28.

In the illustrated embodiment, the terminal base 22 may direct the CHx_Input signal to the resistor 30 in a first input module 26 and measure an electrical property (e.g., voltage, current, etc.) across the resister 30 using the respective measuring device 32. In the illustrated embodiment, the first input module 26 provides the input load resistance (through its resistor 30) while the remaining input modules 27, 28 are electrically uncoupled from the terminal base 22 though physically coupled to the terminal base 22. That is, coupling the first input module 26 in the terminal base 22 may cause the contact connector 34 of the first input module 26 to electrically couple to the channel input wire 38 and the channel return wire 40 of the terminal base 22. Moreover, coupling the first input module 26 in the terminal base 22 may cause the contact connector 34 of the first input module 26 to electrically uncouple the other input modules 27, 28 from the terminal base 22. That is, when the first input module 26 is coupled to the terminal base 22, the contact connector 34 of the first input module 26 is electrically coupled to one portion of the contact 36 while opening the circuit to the rest of the input modules 27, 28. When the first input module 26 is uncoupled from the terminal base 22, the contact connector 34 of the first input module 26 is electrically uncoupled from the contact 36 and the contacts 36 close to provide an electrical connection to one of the other input modules 27, 28. In contrast, when the input module 26 is coupled to the terminal base 22, the CHx_Input signal 38 may not travel through the resistors 30 of the remaining input modules 27, 28 because the contact connector 34 of the input module 26 may prevent input modules 27, 28 from electrically coupling to the channel input wire 38 and/or the channel return wire 40. Although FIG. 2 illustrated the three input modules 26, 27, 28, it should be noted that any number of input modules 20 greater than one may be utilized.

As mentioned above, the measuring device 32 may measure one or more electrical properties of the resistor 30. In some embodiments, the measuring device 32 may measure a voltage across the resistor 30. In particular, each measuring device 32 of each of the three input modules 26, 27, 28 may measure the voltage over the resistor 30 of the input module 26 since the measuring device 32 of each of the three input modules 26, 27, 28 is electrically coupled across the resistor of the input module 26. In some embodiments, the control/monitoring device 14 may determine a current of the terminal base 22 by dividing the voltage over the first resistor 30 by a resistance of the first resistor 30. The control/monitoring device 14 may then determine a corresponding value related to a sensor coupled to the three input modules 26, 27, 28. For example, if a thermal 4-20 mA sensor is coupled to each of the three input modules 26, 27, 28, then the control/monitoring device 14 may determine a temperature value sent by the sensor based on the current across the resistor 30 being measured.

In some embodiments, the control/monitoring device 14 may determine a single electrical property value based on a plurality of measurements provided by each measuring device 32 of the input modules 26, 27, 28. In particular, the control/monitoring device 14 may determine an adjusted value based on the three values returned by the three measuring devices 32 of the three input modules 26, 27, 28. The control/monitoring device 14 may determine the adjusted value using a mean, median, or the like calculation based on the three values determined by the three measuring devices 32. In this manner, the control and monitoring system 10 may provide improved calculations in measuring electrical properties across the resistor 30.

Figure 3:
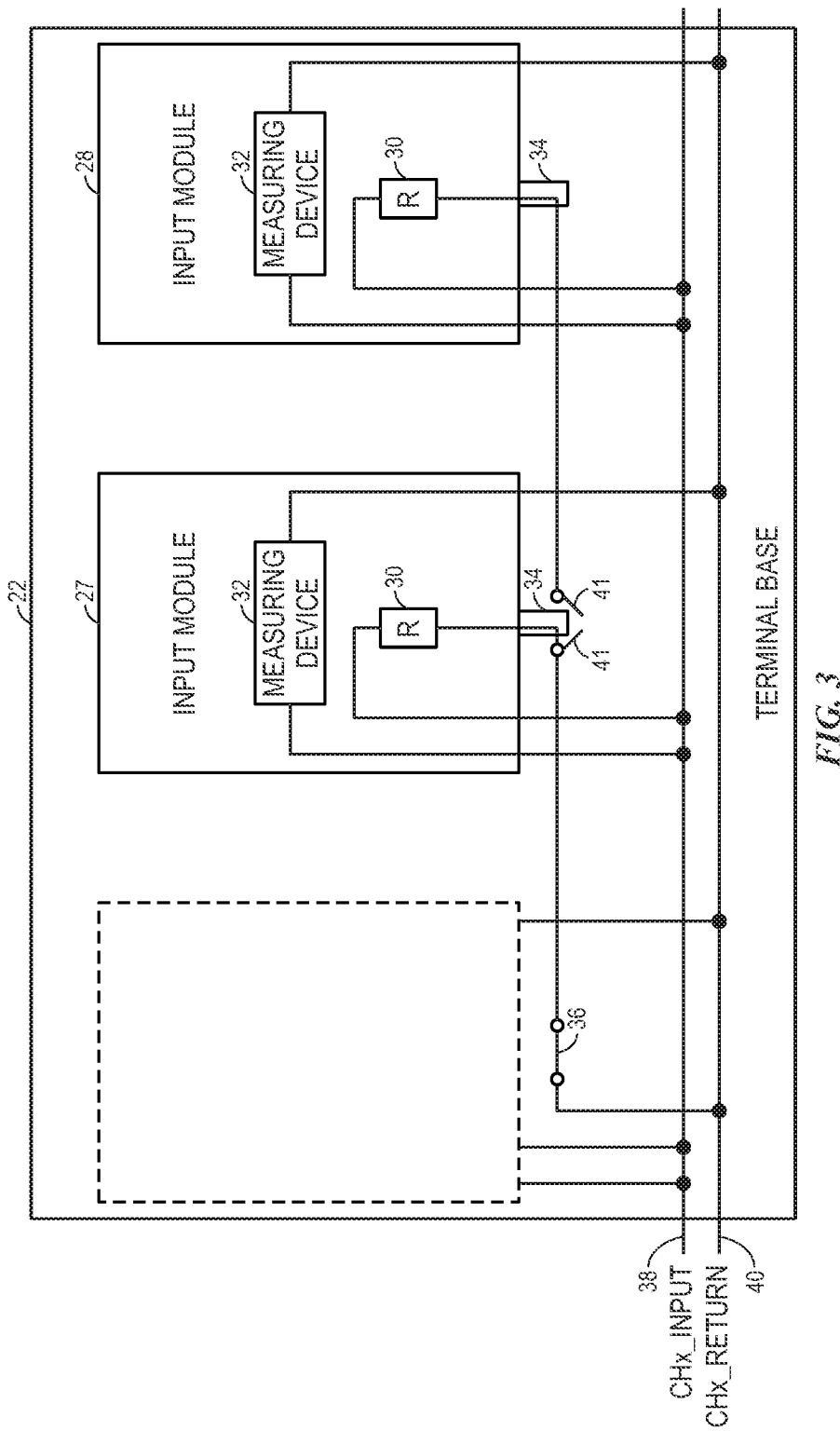
FIG. 3 is a schematic diagram of the terminal base of FIG. 2 with one input module removed, in accordance with an embodiment of the present disclosure.

FIG. 3 is a schematic diagram of the terminal base 22 of FIG. 2 with one input module (e.g., 26) removed, in accordance with an embodiment of the present disclosure. As shown in FIG. 3, the first input module 26 is uncoupled or removed from the terminal base 22, while the two input modules 27, 28 remain coupled to the terminal base 22. As such, a first contact 36 may be closed such that it may conduct the CHx_Input signal to the second input module 27. In particular, with the first input module 26 uncoupled from the terminal base 22, the terminal base 22 may direct the CHx_Input signal through the closed first contact 36 to the resistor 30 of the second input module 27. The electrical property across the resistor 30 of the second input module 27 may then be measured using the measuring devices 32 of the second input module 27 and the third input module 28. In the illustrated embodiment, the second input module 27 provides the input load resistance (e.g., through its resistor 30) while the remaining input module 28 is electrically uncoupled from the terminal base 22. In particular, the CHx_Input signal does not conduct through the resistor 30 of the remaining input module 28.

Figure 4:
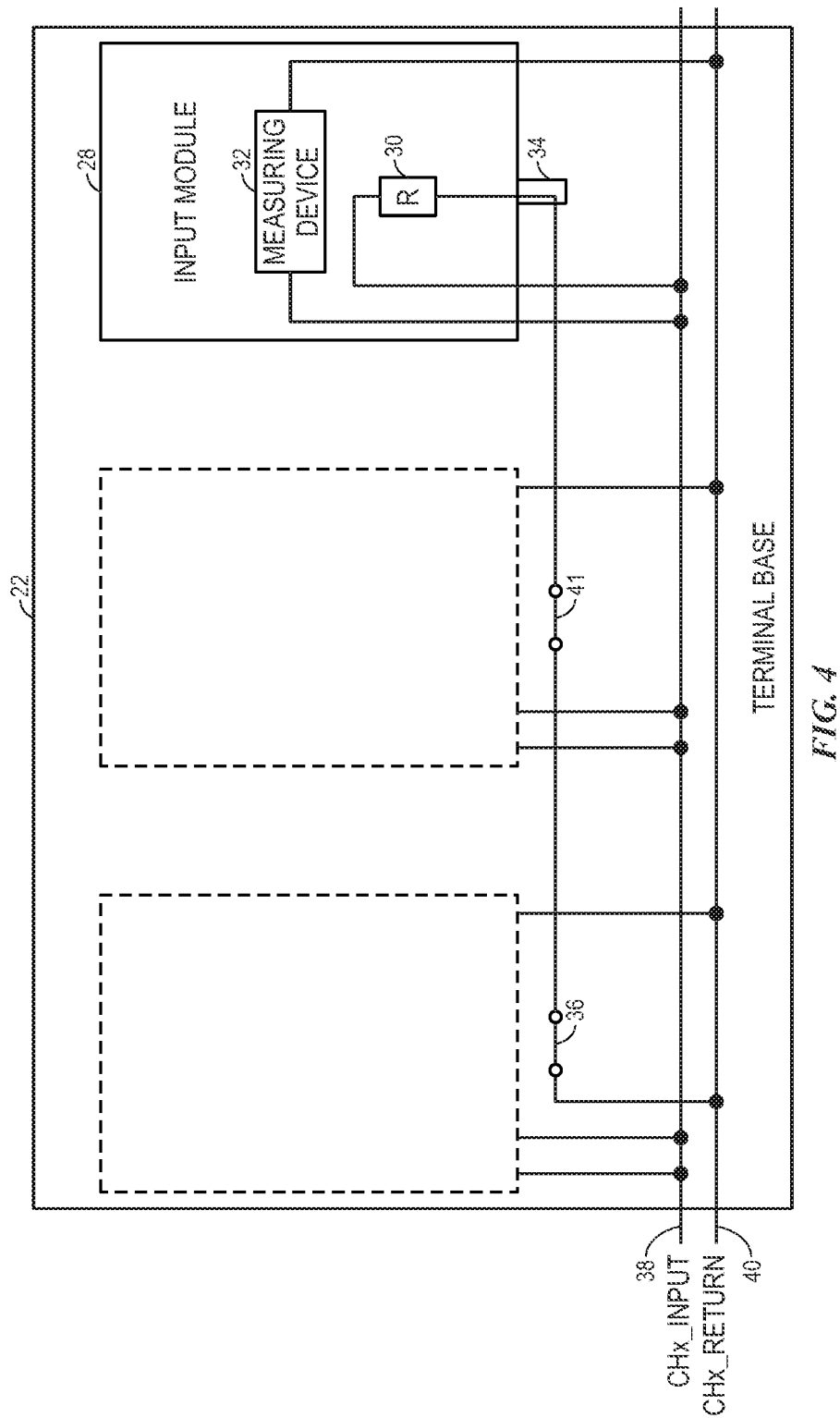
FIG. 4 is a schematic diagram of the terminal base of FIG. 2 with two input modules removed, in accordance with an embodiment of the present disclosure.

FIG. 4 is a schematic diagram of the terminal base 22 of FIG. 2 with two input modules (e.g., 26, 27) removed, in accordance with an embodiment of the present disclosure.

Both the first input module 26 and the second input module 27 are uncoupled from the terminal base 22, while the third input module 28 remains coupled to the terminal base 22. As such, the first contact 36 and a second contact 41 may be closed such that they may conduct the CHx_Input signal to the third input module 28. With the first input module 26 and the second input module 27 uncoupled from the terminal base 22, the terminal base 22 may direct the CHx_Input signal 38 through the closed contacts 36, 41 to the resistor 30 of the third input module 28 and measure the electrical properties across the resistor 30 using the measuring device 32 of the third input module 28. In the illustrated embodiment, the third input module 28 provides the input load resistance (e.g., through its resistor 30).

The embodiments described above adjust a resistance (i.e., resistor 30) of the terminal base 22 as each input module 20 is coupled to and/or uncoupled from the terminal base 22. In particular, a single input resistor (i.e., the resistor 30) of predetermined resistance of a single input module (e.g., the first input module 26) may be electrically coupled to the terminal base 22, while the resistors 30 of the remaining input modules (e.g., the second input module 27 and the third input module 28) are isolated from the circuit. As the input modules 20 are coupled to and/or uncoupled from the terminal base 22, a single input resistor (i.e., the resistor 30) of predetermined resistance of a single input module 20 may be electrically coupled to the terminal base 22. In this manner, an input channel resistance of a redundant monitoring system may be kept constant regardless of whether one or more input modules 20 are coupled to the terminal base 22. Moreover, if one of the redundant input modules 20 becomes unavailable (e.g., because of internal power supply problems, circuitry issues, etc.) or inoperable, the respective input module 20 may be removed and the input measurement may still be provided by another measuring device 32 from another input module 20 to provide redundancy.

Advantageously, the embodiments described above enable selecting the input channel resistance by utilizing a connection between the terminal base 22 and the input module 20. Thus, the use and added expense of control logic that sends an input signal to one input module, but not other input modules, may be avoided. Additionally, including the input resistor 30 in the input module 20 enables the terminal base 22 to be a generic component (i.e., not specifically designed for a certain type of input module 20), avoiding further expense when replacing failed input modules 20.

Figure 5:
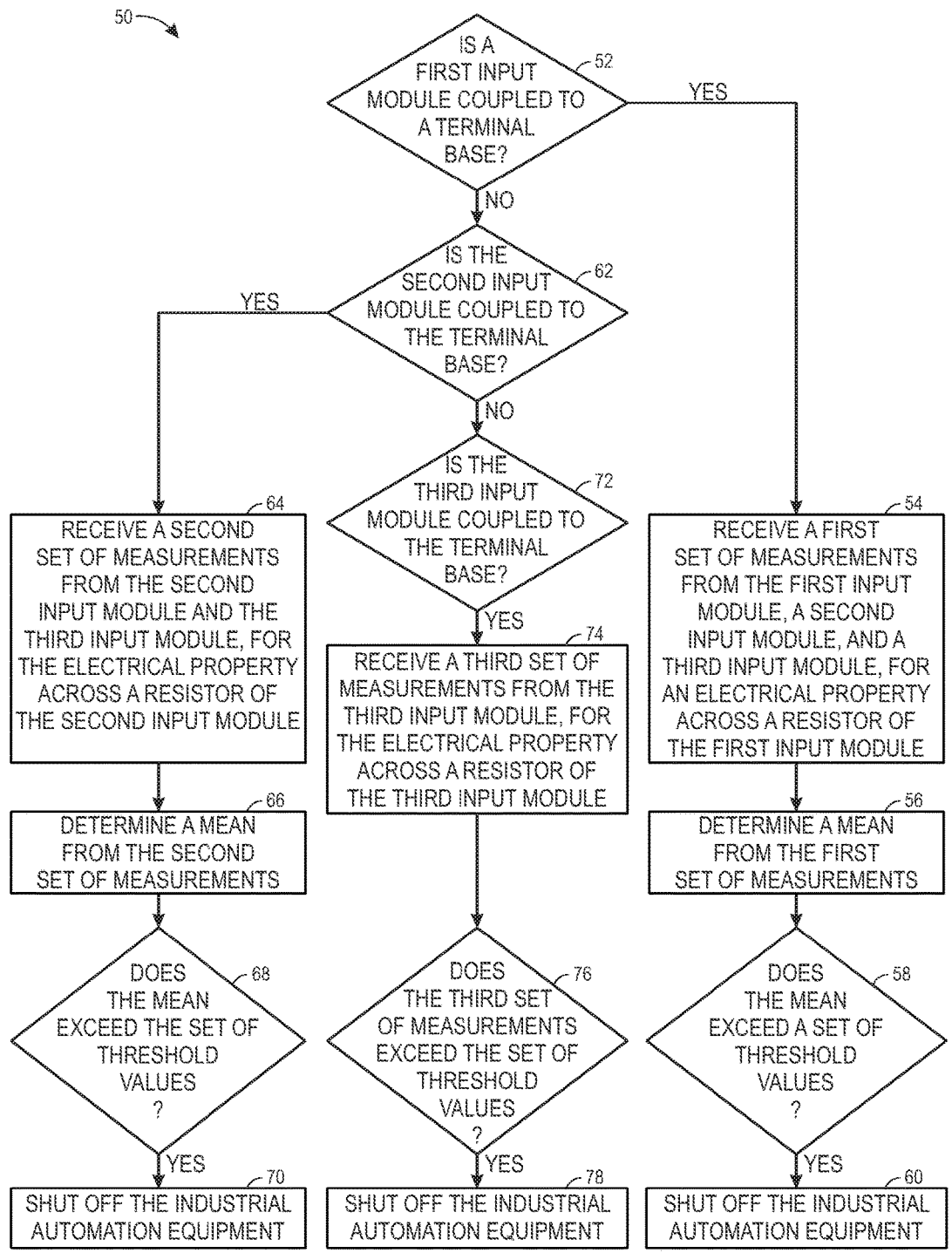
FIG. 5 is a flowchart of a method for redundant monitoring of control and monitoring system of FIG. 1, in accordance with an embodiment of the present disclosure.

FIG. 5 is a flowchart of a method 50 for redundant monitoring of the control and monitoring system 10 of FIG. 1, in accordance with an embodiment of the present disclosure. In this example, the method 50 is performed by the control/monitoring device 14. However, it should be noted that the method 50 may be performed by any suitable processor or any device with a processor or processors. It should also be noted that while the method 50 is described using three redundant input modules, it may be performed using any number of redundant input modules greater than one. If a first input module 26 is coupled to a terminal base 22 (block 52), then the control/monitoring device 14 receives (block 54) a first set of measurements from the first input module 26, the second input module 27, and the third input module 28, relating to an electrical property across a resistor 30 of the first input module 26. For example, referring to FIG. 2, assuming the three input modules 26, 27, 28 are coupled to the terminal base 22, each measuring device 32 of each of the three input modules 26, 27, 28 may measure the electrical property over the resistor 30 of the first input module 26.

In some embodiments, the electrical property may be voltage. In particular, each measuring device 32 of each of the three input modules 26, 27, 28 may measure the voltage over the first resistor 30. In some embodiments, the control/monitoring device 14 may determine a current of a circuit of the terminal base 22 by dividing the voltage over the first resistor 30 by a resistance of the resistor 30. The control/monitoring device 14 may then determine a corresponding value related to a sensor coupled to the three input modules 26, 27, 28. For example, if a thermal 4-20 mA sensor is coupled to the three input modules 26, 27, 28, then the control/monitoring device 14 may determine a temperature value sent by the sensor based on the current of the circuit.

The control/monitoring device 14 then determines (block 56) a mean from the first set of measurements from the three input modules of the electrical property. In some embodiments, the control/monitoring device 14 may determine other calculations related to the accuracy of the electrical property value, such as a maximum, a minimum, a median or the like calculation based on the three electrical property values provided by the three input modules. In this manner, the control and monitoring system 10 may provide redundancy in measuring one or more electrical properties across the resistor 30. If the first mean exceeds a set of threshold values (block 58), then the control/monitoring device 14 shuts off (block 60) the industrial automation equipment 16. The set of threshold values may be pre-defined based on the electrical property that indicates an action is desired. For example, the set of threshold values may include a temperature at which the industrial automation equipment 16 may no longer be able to operate efficiently. If the mean exceeds the threshold temperature value, it may be desired for the control/monitoring device 14 to shut down. In some embodiments, other actions may be taken, such as sending a signal or data (e.g., an alert or message), setting the industrial automation equipment 16 to a standby mode, etc.

If the first input module 26 is not coupled to the terminal base 22 (block 52), and a second input module 27 is coupled to the terminal base 22 (block 62), then the control/monitoring device 14 receives (block 64) a second set of measurements from the second input module 27 and the third input module 28 relating to an electrical property across a resistor 30 of the second input module 27. The control/monitoring device 14 then determines (block 66) a mean from the second set of measurements from the two input modules of the electrical property. If the mean exceeds the set of threshold values (block 68), then the control/monitoring device 14 shuts off (block 70) the industrial automation equipment 16.

If the second input module 27 is not coupled to the terminal base 22 (block 62), and the third input module 28 is coupled to the terminal base 22 (block 72), then the control/monitoring device 14 receives (block 74) a third set of measurements from the third input module 28 regarding an electrical property across a resistor 30 of the third input module 28. If the third set of measurements exceeds the set of threshold values (block 76), then the control/monitoring device 14 shuts off (block 78) the industrial automation equipment 16.

Advantageously, the method 50 does not require actively determining whether the input modules are coupled to the terminal base 22. That is, because selecting the input channel resistance is enabled by utilizing the connection between the terminal base 22 and the input modules rather than active components, the control/monitoring device 14 receives relevant data based on the input modules 20 being coupled to the terminal block 22 instead of receiving a signal indicating that the input modules 20 are coupled to the terminal block 22.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An input module, comprising:
   a resistor;
   a measuring device configured to measure an electrical property across the resistor; and
   a contact connector configured to:
      open one or more contacts of a terminal base in response to the input module being placed in the terminal base;
      electrically couple the resistor and the measuring device to a circuit in response to placing the input module in the terminal base; and
      electrically disconnect one or more other resistors of one or more other input modules from the circuit in response to opening the one or more contacts of the terminal base.

2. The input module of claim 1, wherein the input module is configured to couple to the terminal base via the contact connector.

3. The input module of claim 1, wherein the measuring device is an analog-to-digital converter or an operational amplifier.

4. The input module of claim 1, wherein placing the input module in the terminal base comprises physically coupling the input module to the terminal base.

5. The input module of claim 1, wherein placing the input module in the terminal base comprises manually coupling the input module to the terminal base.

6. A system, comprising:
   a control device configured to coordinate within the system to control one or more operations of industrial automation equipment;
   a terminal base configured to couple to the control device, wherein the terminal base comprises a circuit and one or more contacts disposed along the circuit;
   a first input module and a second input module configured to couple to the terminal base, wherein the first input module comprises a first resistor, a contact connector, and a first measuring device, wherein the second input module comprises a second resistor and a second measuring device, and wherein the contact connector is configured to open a contact of the one or more contacts of the terminal base when the first input module being physically placed in the terminal base; and
   wherein the terminal base is configured to electrically couple the first resistor to the circuit in response to physically placing the first input module in the terminal base, and wherein the terminal base is configured to electrically isolate the second resistor from the circuit in response to the contact connector of the first input module opening the contact of the terminal base.

7. The system of claim 6, wherein the terminal base is configured to electrically couple the second resistor to the circuit in response to the first input module being uncoupled from the terminal base.

8. The system of claim 6, wherein the first measuring device and the second measuring device are configured to measure an electrical property across the first resistor in response to the first input module and the second input module being coupled to the terminal block.

9. The system of claim 8, wherein the electrical property is voltage.

10. The system of claim 9, wherein the control device is configured to:
    determine a current value based on the voltage; and
    convert the current value to a sensor value corresponding to a sensor configured to couple to the first input module, the second input module, or both.

11. The system of claim 10, wherein the sensor is configured to monitor one or more properties of the industrial automation equipment.

12. The system of claim 8, wherein the control device is configured to determine a mean of measurements of the electrical property across the first resistor provided by the first measuring device and the second measuring device.

13. The system of claim 12, wherein the control device is configured to compare the mean of the measurements to a threshold value.

14. The system of claim 13, wherein control device is configured to send a signal relating the industrial automation equipment in response to the mean of the measurements exceeding the threshold value.

15. The system of claim 7, wherein uncoupling the first input module being from the terminal base causes the contact of the one or more contacts to close.

16. A method, comprising:
    receiving, via a processor, a first set of measurements from a first input module, wherein the first set of measurements is associated with a first electrical property across a first resistor of the first input module, wherein the first resistor is electrically coupled to a circuit in response to placing the first input module in a terminal base in conjunction with a second resistor of a second input module being electrically disconnected from the circuit in response to a first contact connector of the first input module opening one or more contacts of the a terminal base;
    adjusting, via the processor, one or more operations of industrial automation equipment in response to the first set of measurements exceeding a threshold value;
    receiving, via the processor, a second set of measurements from the second input module, wherein the second set of measurements is associated with a second electrical property across a second resistor of the second input module, wherein the second resistor is electrically coupled to the circuit in response to the one or more contacts of the terminal base being closed, wherein the one or more contacts of the terminal base are closed in response to removing the first input module from the terminal base, and wherein removing the first input module from the terminal base electrically disconnects the first resistor from the circuit; and
    adjusting, via the processor, the one or more operations of the industrial automation equipment in response to the second set of measurements exceeding the threshold value.

17. The method of claim 16, comprising determining, via the processor, a mean of the first set of measurements and adjusting the one or more operations of the industrial automation equipment in response to the mean exceeding the threshold value.

18. The method of claim 16, comprising sending, via the processor, a notification regarding the first set of measurements or the second set of measurements exceeding the threshold value to a human machine interface.

19. The method of claim 16, comprising comparing, via the processor, a maximum measurement of the first set of measurements to the threshold value in response to determining whether the first set of measurements exceeds the threshold value.

20. The method of claim 16, comprising comparing, via the processor, a minimum measurement of the first set of measurements to the threshold value in response to determining whether the first set of measurements exceeds the threshold value.

* * * * *